(12) United States Patent
Choi et al.

(10) Patent No.: US 10,374,200 B2
(45) Date of Patent: Aug. 6, 2019

(54) BATTERY PACK HAVING FIXING PART FOR PCM

(71) Applicant: LG CHEM, LTD., Seoul (KR)

(72) Inventors: Mi Geum Choi, Daejeon (KR); Dong Cheol Lee, Daejeon (KR); Jong Woon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 353 days.

(21) Appl. No.: 15/304,348

(22) PCT Filed: Apr. 29, 2014

(86) PCT No.: PCT/KR2014/003749
§ 371 (c)(1),
(2) Date: Oct. 14, 2016

(87) PCT Pub. No.: WO2015/167033
PCT Pub. Date: Nov. 5, 2015

(65) Prior Publication Data
US 2017/0033333 A1    Feb. 2, 2017

(51) Int. Cl.
*H01M 2/00* (2006.01)
*H01M 2/10* (2006.01)
(Continued)

(52) U.S. Cl.
CPC ....... *H01M 2/1022* (2013.01); *H01M 2/0212* (2013.01); *H01M 2/0275* (2013.01);
(Continued)

(58) Field of Classification Search
CPC ............. H01M 2/1022; H01M 2/0121; H01M 2/0275; H01M 2/1061; H01M 2/348;
(Continued)

(56) References Cited

U.S. PATENT DOCUMENTS 8,115,455 B2   2/2012  Sellin et al.
8,174,237 B2   5/2012  Kosugi et al.
(Continued)

FOREIGN PATENT DOCUMENTS

CN    102916262 A    2/2013
CN    103718342 A    4/2014
(Continued)

OTHER PUBLICATIONS

Translation of KR1020140046227.*
International Search Report for PCT/KR2014/003749 (PCT/ISA/210) dated Jan. 26, 2015.

*Primary Examiner* — Jane J Rhee
(74) *Attorney, Agent, or Firm* — Birch, Stewart, Kolasch & Birch, LLP (57) ABSTRACT

Disclosed herein is a battery pack configured to have a structure including a plate-shaped battery cell having electrode terminals formed at one side thereof including a sealed surplus part and a protection circuit module (PCM) mounted at the sealed surplus part, wherein each of the electrode terminals of the battery cell is made of a plate-shaped conductive member, the PCM includes a protection circuit board (PCB), a safety element electrically connected between one of the electrode terminals of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case includes a PCB receiving part open outward at one side thereof and at least one fixing part to mount the module case to the sealed surplus part of the battery cell, and the PCM is loaded on the sealed surplus part of the battery cell while being received in the module case in a state in which the PCM is electrically connected to the electrode terminals of the battery cell.

18 Claims, 9 Drawing Sheets

(51) Int. Cl.
 *H01M 2/02* (2006.01)
 *H01M 2/34* (2006.01)
 *H01M 10/04* (2006.01)
 *H01M 10/42* (2006.01)

(52) U.S. Cl.
 CPC ......... *H01M 2/1061* (2013.01); *H01M 2/348* (2013.01); *H01M 10/0436* (2013.01); *H01M 10/425* (2013.01); *H01M 10/4235* (2013.01); *H01M 10/4257* (2013.01); *H01M 2200/10* (2013.01); *H01M 2200/103* (2013.01); *H01M 2200/106* (2013.01); *H01M 2220/30* (2013.01)

(58) Field of Classification Search
 CPC ......... H01M 10/0436; H01M 10/4235; H01M 10/425; H01M 10/4257; H01M 2200/10; H01M 2200/103; H01M 2200/106; H01M 2200/30
 See application file for complete search history.

(56) References Cited

U.S. PATENT DOCUMENTS

| | | |
|---|---|---|
| 2004/0180260 A1 | 9/2004 | Somatomo et al. |
| 2005/0208346 A1 | 9/2005 | Moon et al. |
| 2010/0244772 A1 | 9/2010 | Chan et al. |
| 2012/0202105 A1 | 8/2012 | Shinyashiki et al. |
| 2013/0034752 A1 | 2/2013 | Choi et al. |
| 2013/0040170 A1 | 2/2013 | Choi et al. |
| 2013/0157085 A1 | 6/2013 | Bang et al. |
| 2014/0145896 A1 | 5/2014 | Bi et al. |
| 2014/0147707 A1 | 5/2014 | Choi et al. |

FOREIGN PATENT DOCUMENTS

| | | |
|---|---|---|
| JP | 2003-142043 A | 5/2003 |
| JP | 2005-158308 A | 6/2005 |
| JP | 2008-293940 A | 12/2008 |
| JP | 2012-164470 A | 8/2012 |
| JP | 2013-38064 A | 2/2013 |
| JP | 2014-522089 A | 8/2014 |
| KR | 10-2004-0013123 A | 2/2004 |
| KR | 10-2011-0040670 A | 4/2011 |
| KR | 10-2012-0081402 A | 7/2012 |
| KR | 10-1227870 B1 | 1/2013 |
| KR | 10-2013-0018576 A | 2/2013 |
| KR | 10-2013-0025245 A | 3/2013 |
| KR | 10-2014-0046227 A | 4/2014 |
| TW | I257728 B | 7/2006 |
| TW | M354187 U1 | 4/2009 |
| TW | 201308726 A | 2/2013 |
| WO | WO 2012/098202 A2 | 7/2012 |
| WO | WO 2013/022211 A2 | 2/2013 |

\* cited by examiner

BATTERY PACK HAVING FIXING PART FOR PCM

TECHNICAL FIELD

The present invention relates to a battery pack including a protection circuit module (PCM) fixing part and, more particularly, to a battery pack configured to have a structure including a plate-shaped battery cell having electrode terminals formed at one side thereof including a sealed surplus part and a PCM mounted at the sealed surplus part, wherein each of the electrode terminals of the battery cell is made of a plate-shaped conductive member, the PCM includes a protection circuit board (PCB), a safety element electrically connected between one of the electrode terminals of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case includes a PCB receiving part open outward at one side thereof and at least one fixing part to mount the module case to the sealed surplus part of the battery cell, and the PCM is loaded on the sealed surplus part of the battery cell while being received in the module case in a state in which the PCM is electrically connected to the electrode terminals of the battery cell.

BACKGROUND ART

A secondary battery represented by a lithium secondary battery exhibiting high energy density and operating voltage and excellent retention and service-life characteristics has been widely used as an energy source for various electronic products as well as various mobile devices.

Depending upon types of external devices in which secondary batteries are used, the secondary batteries may be configured to have a detachable type structure in which the secondary batteries can be easily inserted into and removed from the external devices or to have an embedded type structure in which the secondary batteries are embedded in the external devices. For example, it is possible for a user to insert or remove a battery into or from a device, such as a laptop computer. On the other hand, a device, such as a mobile phone, requires an embedded type battery pack due to the structure and capacity thereof.

Meanwhile, various kinds of combustible materials are contained in the lithium secondary battery. As a result, the lithium secondary battery may be heated or explode due to the overcharge of the battery, the overcurrent in the battery, or other external physical impact against the battery. That is, the safety of the lithium secondary battery is very low. For this reason, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are connected to a battery cell of the lithium secondary battery.

In general, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a flexible printed circuit board (F-PCB) is attached to one side of a double-sided adhesive tape, a protective tape is attached to the other side of the double-sided adhesive tape, and electrode tabs of the F-PCB and the nickel plates are connected to each other by welding in a state in which the F-PCB is in tight contact with the battery cell. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a portion of a sealed part of a battery case, in which the battery cell is received, is bent, and an insulative tape is attached thereto or a barcode is printed thereon. That is, the process is very complicated.

Since a plurality of insulative tapes or parts is required to achieve safe connection as described above, a battery pack assembly process is complicated and manufacturing cost is increased.

In addition, when external impact is applied to the battery pack, the PCM may be damaged or dimensional stability of the battery pack may be greatly lowered due to the use of the insulative tapes, which exhibit low mechanical strength.

Therefore, there is a high necessity for technology that is capable of reducing the number of members mounted to the battery cell to simplify an assembly process, achieving stable coupling between the members loaded on the battery cell, and protecting the PCM.

DISCLOSURE

Technical Problem

Therefore, the present invention has been made to solve the above problems, and other technical problems that have yet to be resolved.

Specifically, it is an object of the present invention to provide a battery pack wherein the number of parts necessary to manufacture the battery pack is reduced, thereby simplifying an assembly process, and structural stability of the battery pack is improved.

It is another object of the present invention to provide a battery pack including a module case having a specific structure to provide higher electric capacity than other different battery packs having the same standard while having a compact structure.

TECHNICAL SOLUTION

In accordance with one aspect of the present invention, the above and other objects can be accomplished by the provision of a battery pack configured to have a structure including a plate-shaped battery cell having electrode terminals formed at one side thereof including a sealed surplus part and a protection circuit module (PCM) mounted at the sealed surplus part, wherein each of the electrode terminals of the battery cell is made of a plate-shaped conductive member, the PCM includes a protection circuit board (PCB), a safety element electrically connected between one of the electrode terminals of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case includes a PCB receiving part open outward at one side thereof and at least one fixing part to mount the module case to the sealed surplus part of the battery cell, and the PCM is loaded on the sealed surplus part of the battery cell while being received in the module case in a state in which the PCM is electrically connected to the electrode terminals of the battery cell.

Consequently, the battery pack according to the present invention is based on the module case structure including the PCB receiving part open outward at one side thereof and at least one fixing part to mount the module case to the sealed surplus part of the battery cell, whereby it is possible to reduce the number of parts constituting the battery pack and to simplify the coupling structure of the battery pack, thereby improving manufacturing processability and stability of the battery pack.

In addition, the module case having the specific structure as described above is applied to the battery pack according to the present invention. Consequently, it is possible to provide higher electric capacity than other different battery packs having the same standard while having a compact structure.

In a concrete example, the plate-shaped battery cell may be a pouch-shaped secondary battery.

Specifically, the pouch-shaped secondary battery may be configured to have a structure in which an electrode assembly is received in a battery case made of a laminate sheet including a metal layer and a resin layer in a sealed state. The electrode assembly may be configured to have a structure including a cathode, an anode, and a separator disposed between the cathode and the anode and may be received in the battery case together with an electrolyte in a sealed state.

The secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

In the present invention, the sealed surplus part means an upper end sealed part formed when the battery case is thermally bonded in a sealed state.

Specifically, a sealed part having a surplus space formed at one of the sealed outer circumferences formed when the electrode assembly is disposed in the battery case made of the laminate sheet in a sealed state is referred to as a sealed surplus part. However, the sealed surplus portion may be replaced by terms, such as a thermally bonded surplus part and a sealed terrace, as long as the specified terms have the same meaning as the sealed surplus part.

In a concrete example, the safety element may be an element to effectively control an abnormal state of the battery pack, such as the overcharge of the battery pack or the overcurrent in the battery pack. Examples of the safety element may include a positive temperature coefficient (PTC) element, a fuse, and a thermal cutoff or cutout (TCO).

The form of the external input and output terminal is not particularly restricted so long as the external input and output terminal can be electrically connected to the PCB to supply electric current from an external device, such as a charger, to the battery cell or to supply electric current from the battery cell to a device, such as a mobile phone. In an embedded type battery pack, the external input and output terminal may be configured in the form of a plate or a wire.

In a concrete example, the at least one fixing part of the module case may be configured to have a hook structure coupled to one end of the sealed surplus part.

In addition, the at least one fixing part of the module case may be formed at the middle of a long side of the module case and opposite end regions of the module case facing the sealed surplus part may protrude toward the sealed surplus part by a length corresponding to the size of the at least one fixing part. Furthermore, a region of the module case at which the at least one fixing part is formed may be depressed in a direction opposite to the sealed surplus part. In this structure, more elastic mounting of the module case to the sealed surplus part is guaranteed.

In another concrete example, the sealed surplus part, to which the at least one fixing part of the module case is coupled, may be provided with a mount part protruding toward the module case. In this structure, more stable mounting of the module case to the sealed surplus part is guaranteed.

In addition, the module case may be configured to have a rectangular parallelepiped box structure and the module case may be provided at an inside thereof with at least one PCB fixing protrusion part.

As described above, the module case includes the fixing part having the specific structure, the PCB receiving part, and the PCB fixing protrusion part. Consequently, it is possible to easily receive and fix the PCB and the safety element in the PCB receiving part. In addition, the module case is configured to have a structure which does not require an additional fixing member or protection member. Consequently, productivity is improved through a simplified assembly process. Furthermore, the PCB and the safety element are securely and stably fixed by the PCB fixing protrusion part in a state in which the PCB and the safety element are received in the PCB receiving part of the module case such that the PCB and the safety element can be electrically isolated and protected from the outside. Consequently, it is possible to improve overall mechanical strength of the PCM and to greatly reduce the amount of an insulative tape used as compared with a conventional embedded type battery pack.

In addition, the module case including the PCB receiving part having the above structure may be easily loaded on the sealed surplus part of the battery cell because the module case has a rectangular parallelepiped box structure, the outer surface of which is smooth.

As a result, the battery pack according to the embodiment of the present invention has a more compact structure than a conventional battery pack. In addition, it is possible to utilize a space occupied by a PCM, a PCM fixing member, or PCM protection members of the conventional battery pack as a space for electrical capacity. Consequently, it is possible to increase electrical capacity of the battery pack having the same standard as the conventional battery pack.

In another concrete example, the battery pack may further include a label attached to outer surfaces of the PCM and the battery cell excluding the external input and output terminal in a wrapping fashion. Consequently, it is possible to more stably secure electrical connection between the electrode terminals of the battery cell and the PCB while maintaining insulation from the battery cell.

In accordance with another aspect of the present invention, there is provided a protection circuit module (PCM), having a specific structure, which is used to constitute the battery pack with the above-stated construction.

Specifically, there is provided a PCM loaded on a sealed surplus part of a plate-shaped battery cell having electrode terminals, each of which is made of a plate-shaped conductive member, formed at an upper end thereof, wherein the PCM includes a PCB, a safety element electrically connected between one of the electrode terminals of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case includes a PCB receiving part open outward at one side thereof and at least one fixing part to mount the module case to the sealed surplus part of the battery cell, and the PCM is loaded on the sealed surplus part of the battery cell while being received in the module case in a state in which the PCM is electrically connected to the electrode terminals of the battery cell.

In a general process of assembling an embedded type battery pack, a connection member and an F-PCM are coupled, and an insulative tape is attached at each step, so that a PCM assembly is mounted on a battery cell, as previously described. That is, the PCM assembly is mounted to the battery cell using a large number of parts. As a result, a large number of processes are required. In addition, mechanical strength and structural stability of the battery pack are low.

On the other hand, the PCM according to the present invention is configured to have a structure in which the safety element is mounted in the module case in a state in which the safety element is coupled to the PCB. Consequently, structural stability of the battery pack is improved and a process of manufacturing the battery pack is greatly simplified.

In a concrete example, the external input and output terminal may be configured in the form of a plate or a wire in an embedded type battery pack although the form of the external input and output terminal is not particularly restricted so long as the external input and output terminal can be electrically connected to the PCB to supply electric current from a device, such as a charger, to the battery cell or to supply electric current from the battery cell to a device, such as a mobile phone.

In another concrete example, the at least one fixing part of the module case may be configured to have a hook structure coupled to one end of the sealed surplus part.

In addition, the at least one fixing part of the module case may be formed at the middle of a long side of the module case and opposite end regions of the module case facing the sealed surplus part may protrude toward the sealed surplus part by a length corresponding to the size of the at least one fixing part. Furthermore, a region of the module case at which the at least one fixing part is formed may be depressed in a direction opposite to the sealed surplus part.

In another concrete example, the module case may be configured to have a rectangular parallelepiped box structure and the module case may be provided at an inside thereof with at least one PCB fixing protrusion part.

In accordance with another aspect of the present invention, there is provided a method of manufacturing the battery pack with the above-stated construction.

Specifically, the method of manufacturing the battery pack includes (a) connecting an external input and output terminal to a PCB by welding or soldering, (b) connecting the PCB to electrode terminals of a battery cell by welding or soldering, (c) mounting the PCB in a PCB receiving part, (d) loading the PCM on a sealed surplus part of the battery cell and coupling a PCM fixing part to the sealed surplus part of the battery cell, and (e) attaching a label to outer surfaces of the PCM and the battery cell excluding the external input and output terminal in a wrapping fashion.

In a concrete example, the welding may be spot welding, laser welding, or ultrasonic welding although the welding is not particularly restricted so long as electrical connection is achieved by the welding.

As compared with a method of manufacturing a conventional embedded type battery pack, the battery pack manufacturing method according to the present invention reduces the number of manufacturing processes and provides a battery pack exhibiting improved structural stability.

In accordance with a further aspect of the present invention, there is provided a mobile device including the battery pack with the above-stated construction as a power source.

Concrete examples of the mobile device in which the battery pack according to the present invention can be used may include a mobile phone, a laptop computer, a netbook computer, a tablet PC, and a smart pad.

The above-described devices or apparatuses are well known in the art to which the present invention pertains and, therefore, a detailed description will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
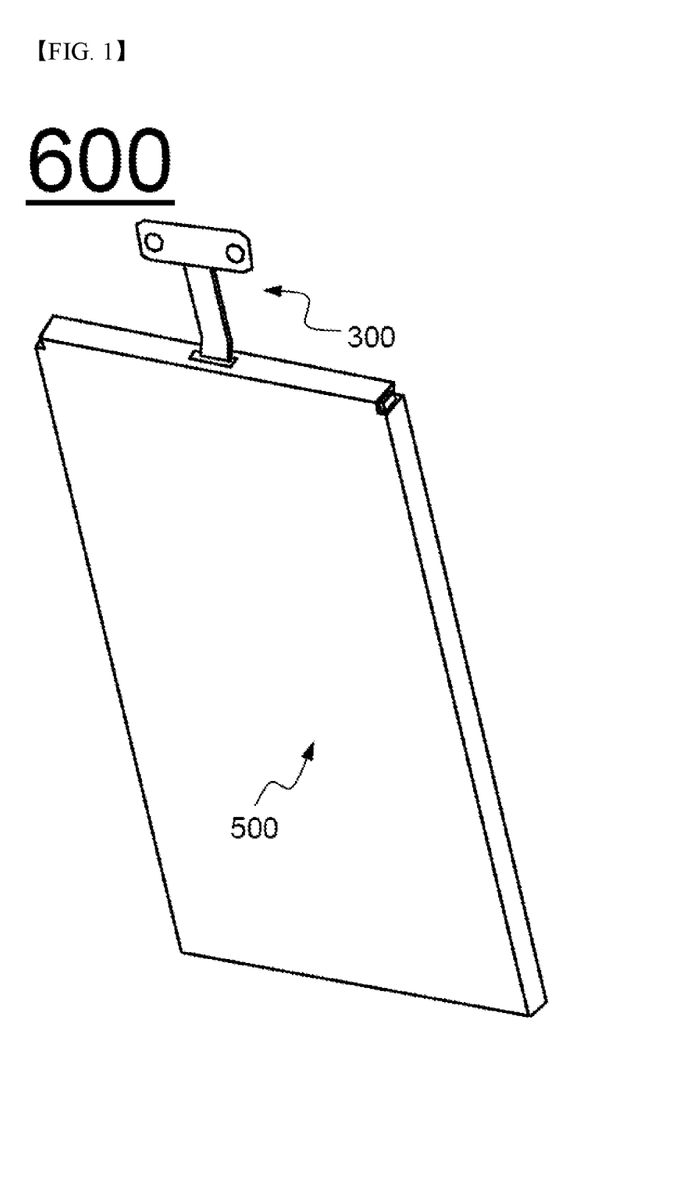
FIG. 1 is a perspective view showing a battery pack according to an embodiment of the present invention.
Figure 2:
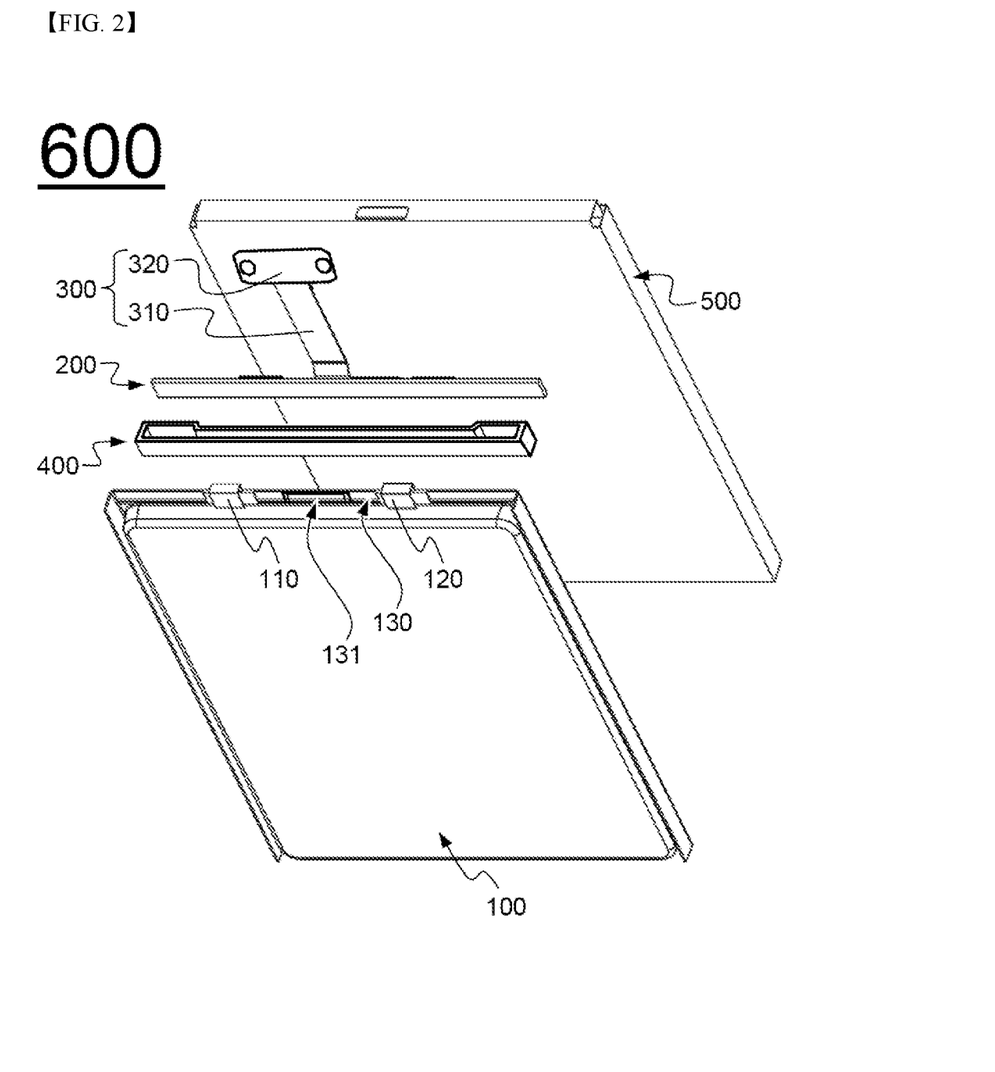
FIG. 2 is an exploded perspective view of the battery pack shown in FIG. 1.

FIG. 1 is a perspective view showing a battery pack according to an embodiment of the present invention and FIG. 2 is an exploded perspective view of the battery pack shown in FIG. 1.

Referring to these drawings, a battery pack 600 includes a plate-shaped battery cell 100 having electrode terminals 110 and 120 formed at one side thereof including a sealed surplus part 130 and an electrically insulative module case 400 to receive a protection circuit module (PCM) 200. The plate-shaped battery cell 100 and the module case 400 are wrapped by a protection label 500.

In addition, a mount part 131 is formed at the sealed surplus part 130 of the battery cell 100 such that the mount part 131 protrudes in a direction in which the module case 400 is loaded.

Meanwhile, the PCB 200 is electrically connected to a connection part 310 of an external input and output terminal 300. The external input and output terminal 300 extends outward from the module case 400. A connector 320 configured to be connected to an external device is formed at the end of the external input and output terminal 300.

FIGS. 3 to 8 are perspective views showing a process of manufacturing a battery pack according to an embodiment of the present invention.

Figure 3:
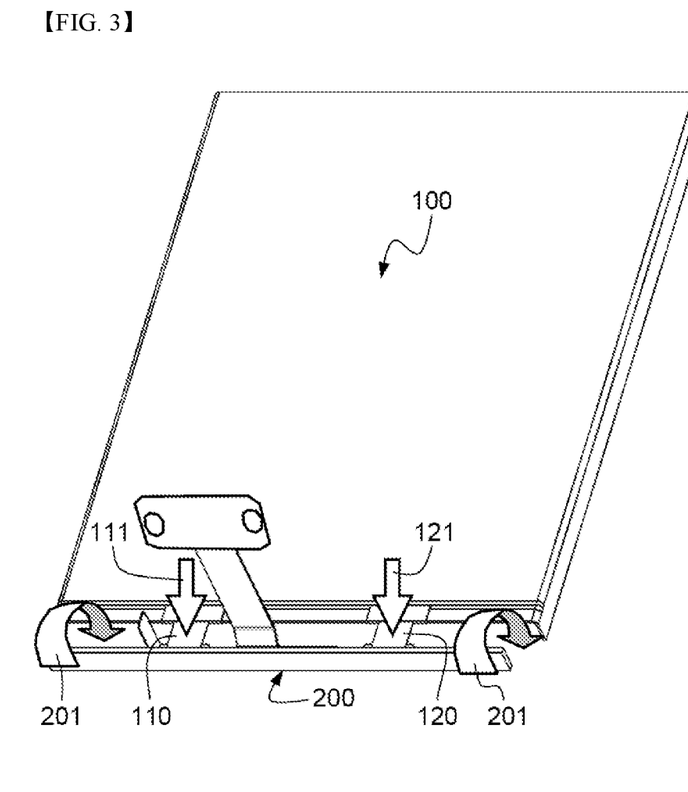
FIGS. 3 to 8 are perspective views showing a process of manufacturing a battery pack according to an embodiment of the present invention.
Figure 4:
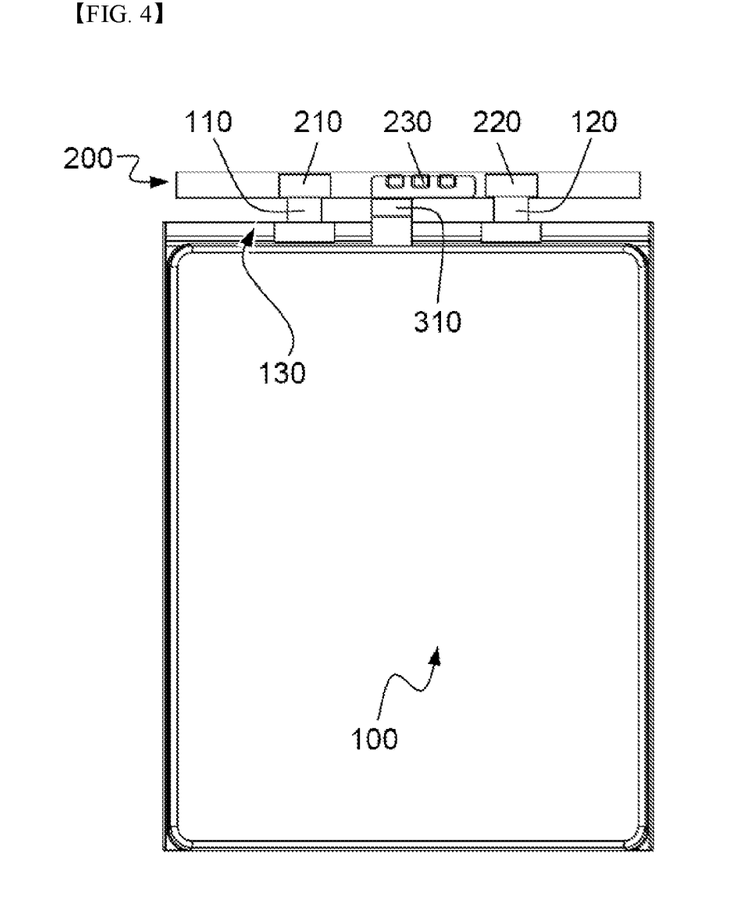

Referring to FIGS. 3 and 4, terminal joint parts 210 and 220 of a PCB 200 are electrically connected to electrode terminals 110 and 120 of a plate-shaped battery cell 100, respectively, by spot welding (see reference numerals 111 and 121). by the After electric connection between the PCB 200 and the electrode terminals 110 and 120 is achieved, the terminal joint parts 210 and 220 of the PCB 200 are bent (see reference numeral 201) such that the terminal connection parts 210 and 220 of the PCB 200 are disposed in parallel to the top and the bottom of the plate-shaped battery cell 100.

Referring to FIG. 4, an external input and output terminal connection part 310 electrically connected to an external input and output terminal joint part 230 of the PCB 200 is directed downward due to bending of the terminal joint parts 210 and 220. A sealed surplus part 130 of the battery cell 100 is formed to have the same width as the PCB 200.

Figure 5:
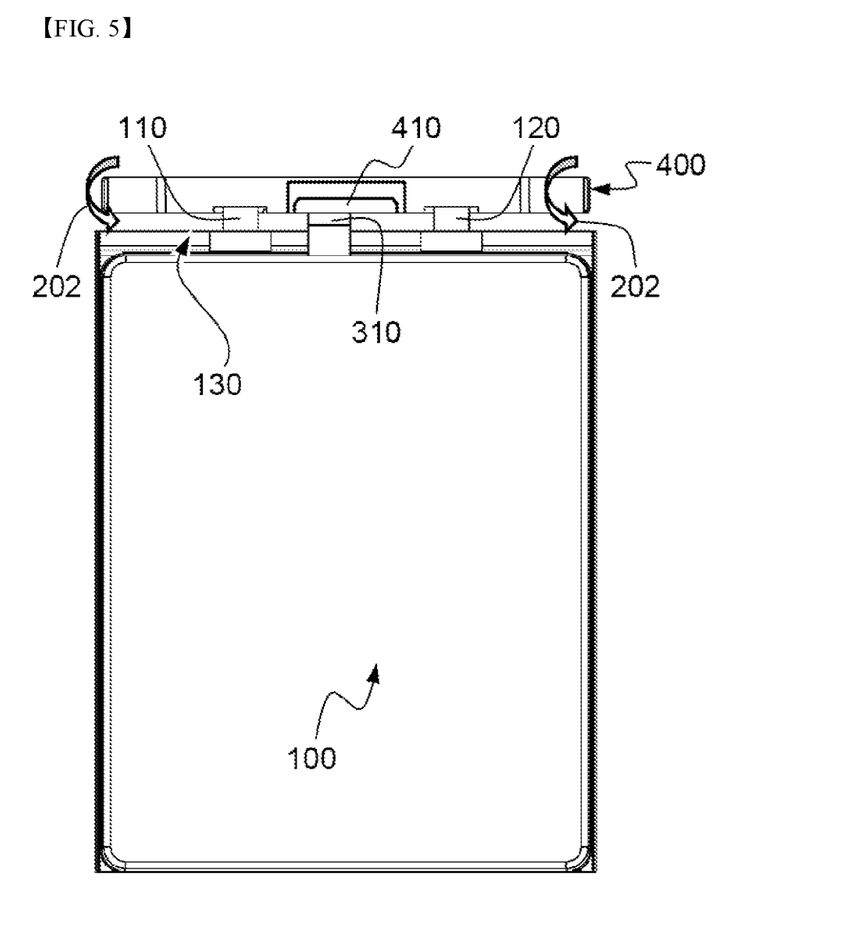
Figure 6:
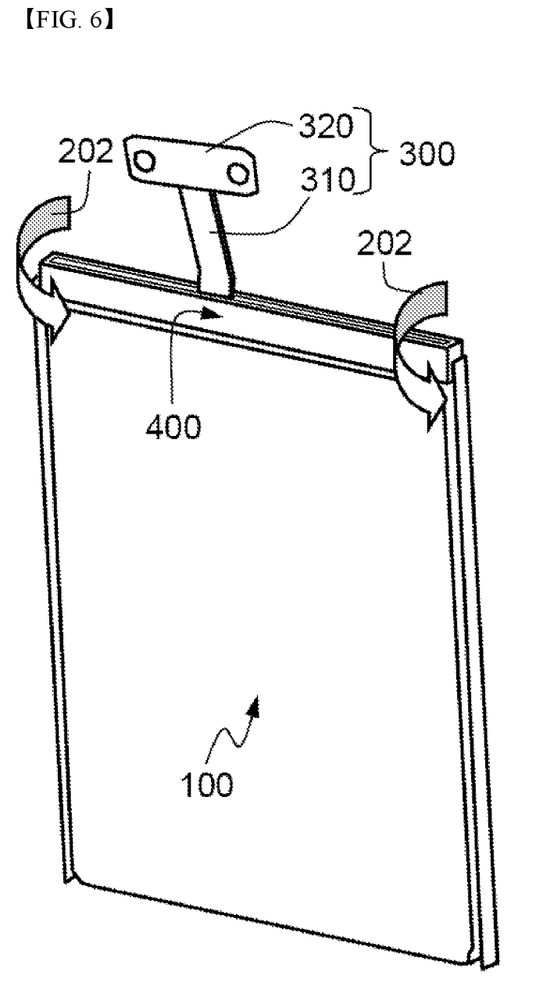
Figure 7:
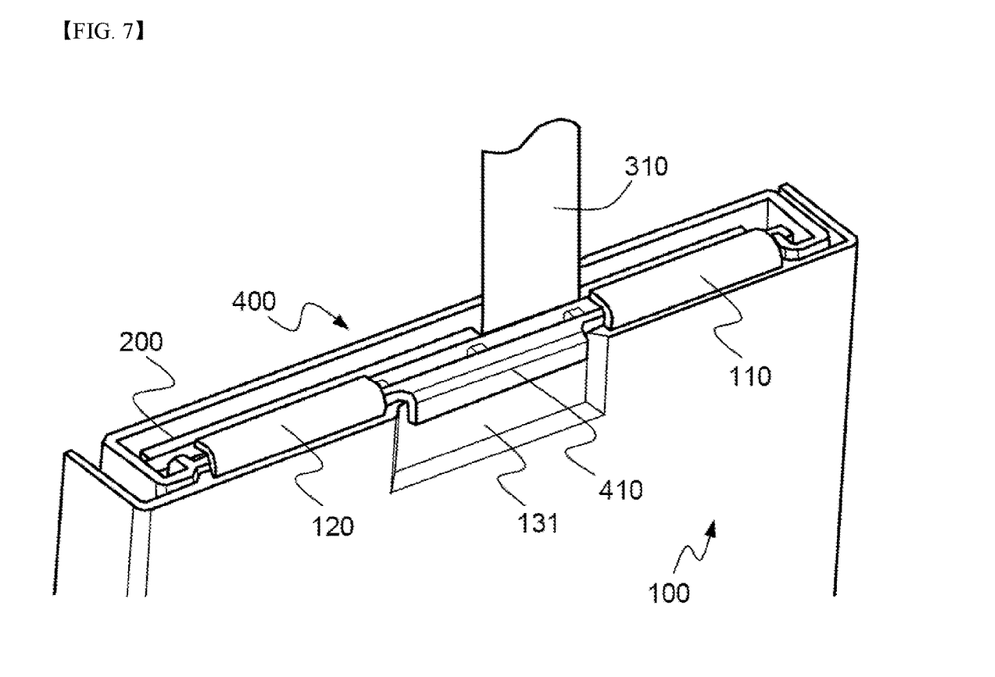

Referring to FIGS. 5 to 7, the PCB 200 is received in a module case 400 and is then loaded on the sealed surplus part 130 of the battery cell 100 by bending of the electrode terminals 110 and 120. Subsequently, a fixing part 410 is fastened to a mount part 131 of the sealed surplus part 130. As a result, the module case 400 is securely fixed to the sealed surplus part 130 of the battery cell 100.

Figure 9:
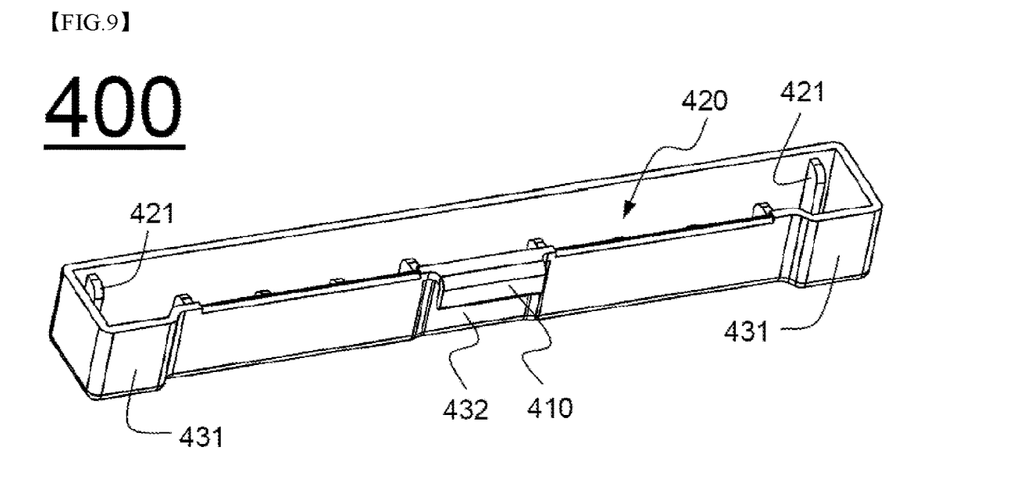
FIG. 9 is a perspective view showing a module case according to an embodiment of the present invention.

Specifically, referring to FIGS. 7 and 9, the fixing part 410, which is formed at one surface of the module case 400, is configured to have a downwardly-bent hook structure and the mount part 131, which is formed on the sealed surplus part 130 of the battery cell 100, is configured to have a structure in which a portion of the sealed surplus part 130 protrudes in a direction in which the module case 400 is loaded.

Meanwhile, as the module case 400 is loaded on the sealed surplus part 130 of the battery cell 100, an external input and output terminal 300 extending outward from the module case 400 is directed upward.

At this time, the width and the length of the module case 400 loaded on the sealed surplus part 130 of the battery cell 100 are approximately equal to the width and the length of the sealed surplus part 130 of the battery cell 100.

In addition, the height of the module case 400 loaded on the sealed surplus part 130 of the battery cell 100 is equal to the thickness of the battery cell 100.

The module case 400 is configured to have a rectangular parallelepiped box structure, the outer surface of which is smooth and which has no additional members. In addition, a plurality of PCB fixing protrusion parts 421 is formed at the inside of the module case 400.

Consequently, the PCB 200 and a safety element (not shown) are securely and stably fixed by the PCB fixing protrusion parts 421 in a state in which the PCB 200 and the safety element are received in a PCB receiving part 420 such that the PCB 200 and the safety element can be electrically isolated and protected from the outside.

As described above, the module case 400 is configured to have an assembly type fastening structure which does not require an additional fixing member or protection member. Consequently, productivity is improved through a simplified assembly process.

In addition, the outer surface of the module case 400 is smooth. Consequently, the battery pack has a smooth outer surface. As a result, the battery pack may be manufactured to have correct dimensions and, at the same time, the battery pack may provide a pleasing external appearance.

Furthermore, as shown in FIGS. 6 and 9, the module case 400 may be easily loaded on the sealed surplus part 130 of the battery cell 100 because the module case 400 has a rectangular parallelepiped box structure, the outer surface of which is smooth.

As a result, the battery pack according to the embodiment of the present invention has a more compact structure than a conventional battery pack. In addition, it is possible to utilize a space occupied by a PCM, a PCM fixing member, or PCM protection members of the conventional battery pack as a space for electrical capacity. Consequently, it is possible to increase electrical capacity of the battery pack.

Figure 8:
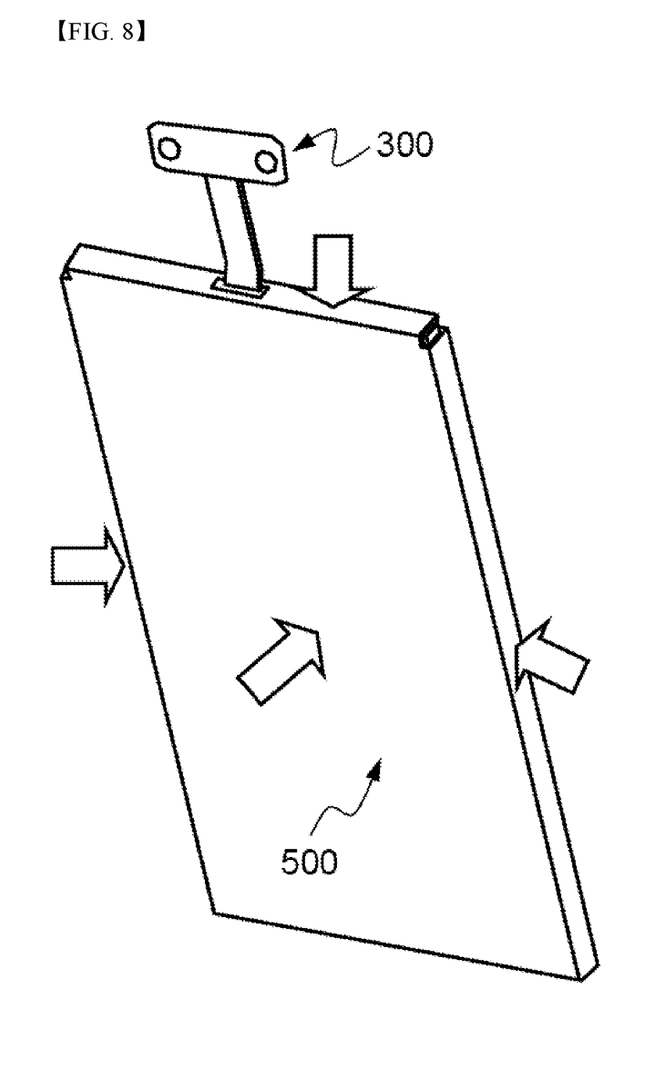

Referring to FIG. 8, the outer surface of the battery cell 100 and the outer surface of the module case 400 excluding the external input and output terminal 300 are wrapped by a protection label 500.

The label 500, which displays product information, more stably secures electrical connection between the electrode terminals 110 and 120 of the battery cell 100 and the PCB 200 while maintaining insulation from the battery cell 100.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a module case structure including a PCB receiving part open outward at one side thereof and one or more fixing parts to mount a module case to a sealed surplus part of a battery cell. Consequently, it is possible to simplify a manufacturing process, to improve structural stability, to provide a battery pack having a compact structure, and to increase electric capacity of a battery pack having the same standard as a conventional battery pack.

The invention claimed is:

1. A battery pack configured to have a structure comprising:
   a plate-shaped battery cell having electrode terminals formed at one side thereof, the plate-shaped battery cell comprising a sealed surplus part; and
   a protection circuit module (PCM) mounted at the sealed surplus part,
   wherein each of the electrode terminals of the battery cell is made of a plate-shaped conductive member, and
   wherein the PCM comprises:
   a protection circuit board (PCB);
   a safety element electrically connected between one of the electrode terminals of the battery cell and the PCB or loaded on the PCB;
   an external input and output terminal electrically connected to a protection circuit of the PCB; and
   an electrically insulative module case in which the PCB and the safety element are mounted in a state in which the external input and output terminal extends outside,
   wherein the module case comprises a PCB receiving part open outward at one side thereof and a hook to mount the module case to the sealed surplus part of the battery cell,
   wherein the hook is connected to a side wall of the module case, the hook extending along an exterior surface of the sealed surplus part, and
   wherein the PCM is loaded on the sealed surplus part of the battery cell while being received in the module case in a state in which the PCM is electrically connected to the electrode terminals of the battery cell.

2. The battery pack according to claim 1, wherein the plate-shaped battery cell is a pouch-shaped secondary battery having an electrode assembly received in a battery case made of a laminate sheet comprising a metal layer and a resin layer in a sealed state.

3. The battery pack according to claim 2, wherein the electrode assembly is configured to have a structure comprising a cathode, an anode, and a separator disposed between the cathode and the anode and is received in the battery case together with an electrolyte in a sealed state.

4. The battery pack according to claim 1, wherein the sealed surplus part is an upper end sealed part formed when a battery case is thermally bonded in a sealed state.

5. The battery pack according to claim 1, wherein the safety element comprises at least one selected from a group consisting of a positive temperature coefficient (PTC) element, a fuse, and a thermal cutoff or cutout (TCO).

6. The battery pack according to claim 1, wherein the external input and output terminal is configured in the form of a plate or a wire.

7. The battery pack according to claim 1, wherein the hook is formed at a middle of a long side of the module case, and opposite end regions of the module case facing the sealed surplus part protrude toward the sealed surplus part by a length corresponding to a thickness of the hook.

8. The battery pack according to claim 7, wherein a region of the module case at which the hook is formed is depressed in a direction opposite to the sealed surplus part.

9. The battery pack according to claim 1, wherein the sealed surplus part, to which the hook is coupled, is provided with a mount part protruding toward the module case.

10. The battery pack according to claim 1, wherein the module case is configured to have a rectangular parallelepiped box structure.

11. The battery pack according to claim 10, wherein the module case is provided at an inside thereof with at least one PCB fixing protrusion part.

12. The battery pack according to claim 1, further comprising a label attached to outer surfaces of the PCM and the battery cell excluding the external input and output terminal in a wrapping fashion.

13. A protection circuit module (PCM) loaded on a sealed surplus part of a plate-shaped battery cell having electrode terminals, each of which is made of a plate-shaped conductive member, formed at an upper end thereof, comprising:
   a protection circuit board (PCB);
   a safety element electrically connected between one of the electrode terminals of the battery cell and the PCB or loaded on the PCB;
   an external input and output terminal electrically connected to a protection circuit of the PCB; and
   an electrically insulative module case in which the PCB and the safety element are mounted in a state in which the external input and output terminal extends outside, the module case comprising a PCB receiving part open outward at one side thereof; and
   a hook to mount the module case to the sealed surplus part of the battery cell, the hook extending outwardly and downwardly from a side wall of the module case, so that a bottom edge of the hook is below a top edge of the side wall of the module case,
   wherein the PCM is loaded on the sealed surplus part of the battery cell while being received in the module case in a state in which the PCM is electrically connected to the electrode terminals of the battery cell.

14. The PCM according to claim 13, wherein the at least one fixing part of the module case is configured to have a hook structure coupled to one end of the sealed surplus part.

15. A method of manufacturing a battery pack according to claim 1, the method comprising:
   (a) connecting an external input and output terminal to a PCB by welding or soldering;
   (b) connecting the PCB to electrode terminals of a battery cell by welding or soldering;
   (c) mounting the PCB in a PCB receiving part;
   (d) loading the PCM on a sealed surplus part of the battery cell and coupling a PCM fixing part to the sealed surplus part of the battery cell; and
   (e) attaching a label to outer surfaces of the PCM and the battery cell excluding the external input and output terminal in a wrapping fashion.

16. The method according to claim 15, wherein the welding is spot welding, laser welding, or ultrasonic welding.

17. A mobile device comprising a battery pack according to claim 1 as a power source.

18. The mobile device according to claim 17, wherein the mobile device is a mobile phone, a laptop computer, a netbook computer, a tablet PC, or a smart pad.

* * * * *